US011824930B1

(12) United States Patent
Burnett et al.

(10) Patent No.: US 11,824,930 B1
(45) Date of Patent: Nov. 21, 2023

(54) DATA SYNCHRONIZATION OF CLOUD DATA BASED UPON NETWORK CONNECTIONS

(71) Applicant: ARCHITECTURE TECHNOLOGY CORPORATION, Eden Prairie, MN (US)

(72) Inventors: Benjamin L. Burnett, Eden Prairie, MN (US); Ranga S. Ramanujan, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 0 days.

(21) Appl. No.: 17/987,222

(22) Filed: Nov. 15, 2022

Related U.S. Application Data

(63) Continuation of application No. 17/537,457, filed on Nov. 29, 2021, now Pat. No. 11,503,119, which is a
(Continued)

(51) Int. Cl.
*H04L 29/08* (2006.01)
*H04L 29/06* (2006.01)
(Continued)

(52) U.S. Cl.
CPC .......... *H04L 67/1095* (2013.01); *H04L 67/01* (2022.05)

(58) Field of Classification Search
CPC ............................ H04L 67/1095; H04L 67/01
See application file for complete search history.

(56) References Cited

U.S. PATENT DOCUMENTS 8,745,755 B2   6/2014   Borzycki et al.
9,350,616 B1   5/2016   Lou et al.
(Continued)

OTHER PUBLICATIONS

"Mohamed Nazih El-Derini, DroidCloulet: Towards Cloudlet-based Computing using Mobile Devices, 2014, IEEE, 5th International Conference on Information and Communication Systems, pp. 1-6" (Year: 2014).*
(Continued)

*Primary Examiner* — Christopher B Robinson
(74) *Attorney, Agent, or Firm* — FOLEY & LARDNER LLP

(57) ABSTRACT

Disclosed herein are embodiments of a cloud data synchronization system enabling an user operating a mobile client device to download mission-specific data sets from a fixed cloud-based server system to a database of the mobile client device, and then use the downloaded data sets independently on the mobile client device when the mobile client device is disconnected from a network connecting to the fixed cloud-based server system. When connectivity to the fixed cloud-based server system is re-established by the mobile client device in an intermittent and bandwidth-limited communication network environment, the fixed cloud-based server system may provide bi-directional data synchronization between records of the fixed cloud-based server system and the mobile client device to update the data sets on the fixed cloud-based server system and the mobile client device while operating in the intermittent and bandwidth-limited communication network environment.

18 Claims, 5 Drawing Sheets

Related U.S. Application Data continuation of application No. 17/170,597, filed on Feb. 8, 2021, now Pat. No. 11,190,587, which is a continuation of application No. 16/773,744, filed on Jan. 27, 2020, now Pat. No. 10,986,182, which is a continuation of application No. 15/860,431, filed on Jan. 2, 2018, now Pat. No. 10,547,679.

(51) Int. Cl.
*H04L 67/1095* (2022.01)
*H04L 67/01* (2022.01)

(56) References Cited

U.S. PATENT DOCUMENTS

| | | | |
|---|---|---|---|
| 10,565,067 | B2 | 2/2020 | Dornemann |
| 10,768,971 | B2 | 9/2020 | Dornemann et al. |
| 2009/0247134 | A1 | 10/2009 | Jeide et al. |
| 2012/0179646 | A1 | 7/2012 | Hinton et al. |
| 2012/0303778 | A1 | 11/2012 | Ahiska et al. |
| 2013/0212161 | A1 | 8/2013 | Ben-Shaul et al. |
| 2013/0219061 | A1 | 8/2013 | Wong et al. |
| 2013/0311597 | A1 | 11/2013 | Arrouye et al. |
| 2014/0040446 | A1 | 2/2014 | Cohen et al. |
| 2014/0358252 | A1 | 12/2014 | Ellsworth et al. |
| 2015/0237128 | A1* | 8/2015 | Castro .................. H04L 63/0876 726/4 |
| 2015/0244775 | A1 | 8/2015 | Vibhor et al. |
| 2015/0347119 | A1 | 12/2015 | Wang et al. |
| 2015/0347453 | A1* | 12/2015 | Shetty .................. G06F 16/182 709/213 |
| 2015/0347542 | A1 | 12/2015 | Sullivan et al. |
| 2015/0358858 | A1 | 12/2015 | Xue |
| 2016/0196132 | A1 | 7/2016 | Searle et al. |
| 2016/0301598 | A1 | 10/2016 | Strijkers et al. |
| 2017/0046230 | A1 | 2/2017 | Guzik |
| 2017/0063615 | A1 | 3/2017 | Yang et al. |
| 2017/0085446 | A1 | 3/2017 | Zhong et al. |
| 2017/0163757 | A1 | 6/2017 | Morton et al. |
| 2017/0206218 | A1 | 7/2017 | Jai et al. |
| 2018/0004783 | A1 | 1/2018 | Mehrotra et al. |
| 2018/0131688 | A1 | 5/2018 | Fang et al. |

OTHER PUBLICATIONS

"Department of Defense Cloud Computing Strategy", Jul. 2012 (44 pages).

"Microservices", retrieved Mar. 20, 2018, from URL: https://en.wikipedia.org/wiki/Microservices (8 pages).

"On the Suitability of Mobile Cloud Computing at the Tactical Edge", Defense Research and Development Canada (DRDC), Apr. 23, 2014, DRCD Publication No. DRDC-RDDC-2014-L56, http://publications.gc.ca/collections/collection_2015/rddc-drdc/D68-1-56-2014-eng.pdf (5 pages).

Lewis et al., "Tactical Cloudlets: Moving Cloud Computing to the Edge", 2014, retrieved from URL: http://elijah.cs.cmu.edu/DOCS/lewis-milcom2014.pdf (7 pages).

* cited by examiner

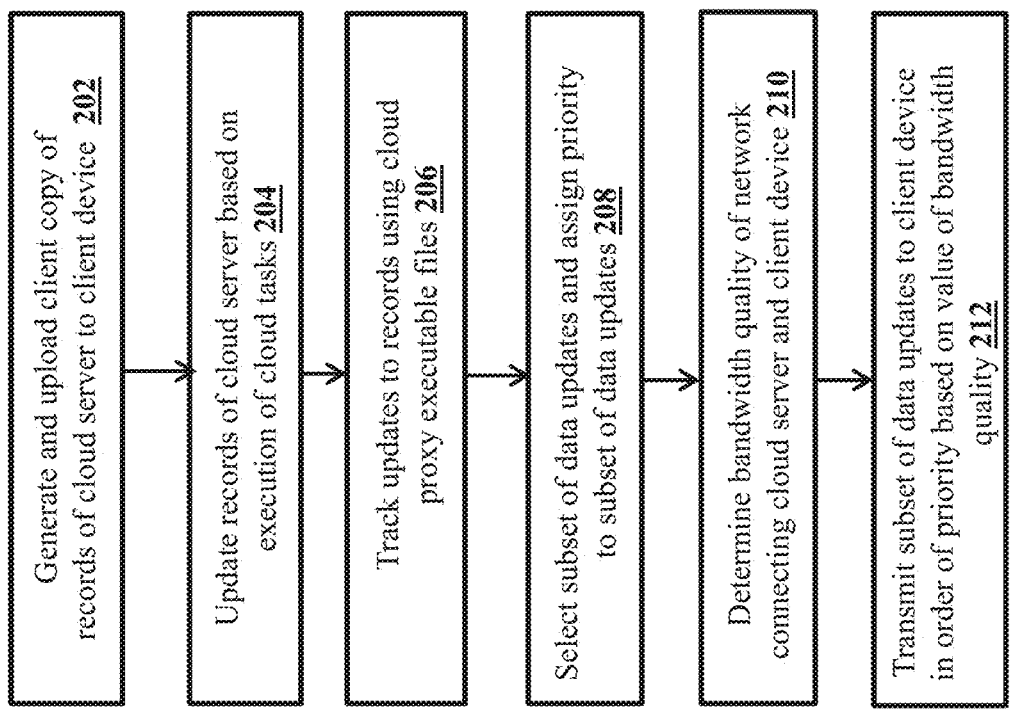

DATA SYNCHRONIZATION OF CLOUD DATA BASED UPON NETWORK CONNECTIONS

CROSS-REFERENCE TO RELATED APPLICATIONS

This application is a continuation application of U.S. application Ser. No. 17/537,457, entitled "Network Sensing for Cloud Data Synchronization," filed Nov. 29, 2022, which is a continuation application of U.S. application Ser. No. 17/170,597, entitled "Synchronizing Cloud Data Based Upon Network Sensing Operations," filed Feb. 8, 2021, issuing as U.S. Pat. No. 11,190,587, which is a continuation application of U.S. application Ser. No. 16/773,744, entitled "Cloud Data Synchronization Based Upon Network Sensing," filed Jan. 27, 2020, now U.S. Pat. No. 10,986,182, which is a continuation application of U.S. application Ser. No. 15/860,431, entitled "Cloud Data Synchronization Based Upon Network Sensing," filed Jan. 2, 2018, now U.S. Pat. No. 10,547,679, all of which are incorporated by reference in their entirety.

This invention was made with government support under contract number H92222-17-P-0100 awarded by Department of Defense, United States Special Operations Command (USSOCOM). The government has certain rights in the invention.

TECHNICAL FIELD

This application relates generally to the field of data synchronization, and more specifically to systems and methods for data synchronization between cloud-based server systems and remote client devices based upon network sensing.

BACKGROUND

In some conventional enterprise systems, data storage, processing and analysis capabilities of various tasks have been migrating to cloud infrastructures. Cloud infrastructures typically comprise computing resources that are immobile and placed at a set of fixed locations. However, for certain organizations such as government agencies (e.g. military) and security services companies, there is a requirement for their personnel (or mobile users) to operate in austere and remote environments. More specifically, the personnel on the ground should have adequate storage, processing and analysis capabilities in the austere and the remote environments in order to be able to execute various tasks in such environments. Accordingly, the personnel on the ground are provided with mobile computing devices (referred to as remote client devices) with requisite hardware capabilities along with one or more databases and application programs. Such remote client devices may operate independently of an associated rear echelon cloud infrastructure (or "master cloud"), however, periodic or continuous synchronization may be required such that the databases and application programs in the remote client devices are up to date. Furthermore, local updates within the remote client devices may have to be uploaded to the rear echelon cloud infrastructure (or "master cloud").

Typically, a communication link is established between cloud infrastructures hosted by an enterprise system of an organization located in a fixed location (for example, in U.S.) and remote client devices used by mobile users of the organization in remote environments in order to synchronize data of the cloud infrastructures and the remote client devices. However, when the communication link is spotty or intermittent as is often the case in an austere and remote environment, data synchronization between the cloud infrastructures of the enterprise system and the remote client devices becomes problematic. Currently, there is no technique available to position, cache, and synchronize data between the cloud infrastructures hosted by the enterprise system of an organization at a fixed location and remote client devices used by mobile users in an austere and remote location. In other words, current techniques cannot effectively handle synchronization between a rear echelon cloud infrastructure and a remote client device using a low quality and unreliable communication network.

SUMMARY

What is therefore desired are systems and methods to enable effective data synchronization between rear echelon cloud-based server systems and the remote client devices through a low quality, spotty, and intermittent communication network.

Embodiments disclosed herein solve the aforementioned technological problems and/or other technological problems. The disclosed systems and methods enable bi-directional data synchronization and re-synchronization of software applications and databases deployed in cloud-based server systems and remote client devices using a low quality and spotty communication link. More specifically, the systems and methods may intelligently and automatically control data synchronization based upon sensing the quality of the communication link.

In some embodiments, a method for cloud data synchronization is disclosed. The method may include generating, by a cloud server, a breakaway cloudlet containing copies of one or more cloud databases and one or more cloud application programs associated with one or more service systems in the cloud server. The method may further include uploading, by the cloud server, the breakaway cloudlet to a client device associated with a client device identifier. The method may further include updating, by the cloud server, the one or more cloud databases and the one or more cloud application programs within the cloud server based upon execution of one or more cloud tasks by the cloud server. The method may further include tracking, by the cloud server using one or more cloud proxy executable files, the updates to the one or more cloud databases and the one or more cloud application programs within the cloud server in one or more transaction log files. The method may further include storing, by the cloud server using the one or more cloud proxy executable files, the one or more transaction log files in a cloud proxy database. The method may further include selecting, by the cloud server, a set of updates associated with the client device in the one or more transaction log files stored in the cloud proxy database using the client device identifier. The method may further include retrieving, by the cloud server, a set of selection criteria associated with the client device identifier. The method may further include assigning, by the cloud server, a first priority to a first subset of updates in the set of selected updates and a second priority to second subset in the set of selected updates based on the set of selection criteria, wherein the first priority is higher than the second priority. The method may further include determining, by the cloud server, bandwidth value of a communications link in a network connecting the cloud server with the client device. The method may further include, in response to determining by the cloud server, that the bandwidth value of the communications link is below a predetermined threshold value, transmitting, by the cloud server to the client device, the first subset of updates before transmitting the second subset of updates.

In some embodiments, a method for cloud data synchronization is disclosed. The method may include generating, by a client device, a request to receive a breakaway cloudlet containing copies of one or more cloud databases and one or more cloud application programs associated with one or more service systems in a cloud server. The method may further include transmitting, by the client device, the request to the cloud server including a client device identifier containing identification information associated with the client device, wherein the client device is configured to store the client device identifier in a database. The method may further include downloading, by the client device, the breakaway cloudlet received from the cloud server. The method may further include updating, by the client device, the one or more cloud databases and the one or more cloud application programs stored within the client proxy database based upon execution of one or more client tasks by the client device. The method may further include tracking, by the client device using one or more client proxy executable files, the updates to the one or more cloud databases and the one or more cloud application programs within the client device in one or more transaction log files. The method may further include storing, by the client device using the one or more client proxy executable files, the one or more transaction log files in a client proxy database. The method may further include selecting, by the client device, a set of updates associated with the client device in the one or more transaction log files stored in the client proxy database. The method may further include retrieving, by the client device, a set of selection criteria associated with the client device identifier. The method may further include assigning, by the client device, a first priority to a first subset of updates in the set of selected updates and a second priority to second subset in the set of selected updates based on the set of selection criteria, wherein the first priority is higher than the second priority. The method may further include determining, by the client device, bandwidth value of a communications link in a network connecting the cloud server with the client device. The method may further include, in response to determining by the client device, that the bandwidth value of the communications link is below a predetermined threshold value, transmitting, by the client device to the cloud server, the first subset of updates before transmitting the second subset of updates.

In some embodiments, a system for cloud data synchronization is disclosed. The system may include a client device and a cloud server. The client device may include a client proxy database and one or more client proxy executable files. The client proxy database is configured to store a breakaway cloudlet containing copies of one or more cloud databases and one or more cloud application programs associated with one or more service systems. The one or more client proxy executable files are configured to track updates to the client proxy database upon execution of one or more client tasks in the client device. The cloud server may include one or more cloud proxy executable files and a processor. The one or more cloud proxy executable files are configured to track updates to the one or more cloud databases and the one or more cloud application programs associated with the one or more service systems of the cloud server in one or more transaction log files. The one or more cloud proxy executable files are further configured to store the updates to the one or more cloud databases and the one or more application programs in a cloud proxy database. The processor is configured to generate the breakaway cloudlet containing the copies of the one or more cloud databases and the one or more cloud application programs associated with the one or more service systems. The processor is further configured to upload the breakaway cloudlet to the client proxy database of the client device associated with a client device identifier. The processor is further configured to update the one or more cloud databases and the one or more cloud application programs within the cloud server based upon execution of one or more cloud tasks by the cloud server. The processor is further configured to select a set of updates associated with the client device in the one or more transaction log files stored in the cloud proxy database using the client device identifier. The processor is further configured to retrieve a set of selection criteria associated with the client device identifier. The processor is further configured to assign a first priority to a first subset of updates in the set of selected updates and a second priority to second subset in the set of selected updates based on the set of selection criteria, wherein the first priority is higher than the second priority. The processor is further configured to determine bandwidth value of a communications link in a network connecting the cloud server with the client device. The processor is further configured to, in response to determining by the processor, that the bandwidth value of the communications link is below a predetermined threshold value, transmit to the client device, the first subset of updates before transmitting the second subset of updates.

BRIEF DESCRIPTION OF THE DRAWINGS

The accompanying drawings constitute a part of this specification and illustrate embodiments of the subject matter disclosed herein.

FIG. 2 illustrates execution of a method for transmission of data from a cloud server to a client device, according to an exemplary embodiment.

DETAILED DESCRIPTION

Figure 1A:
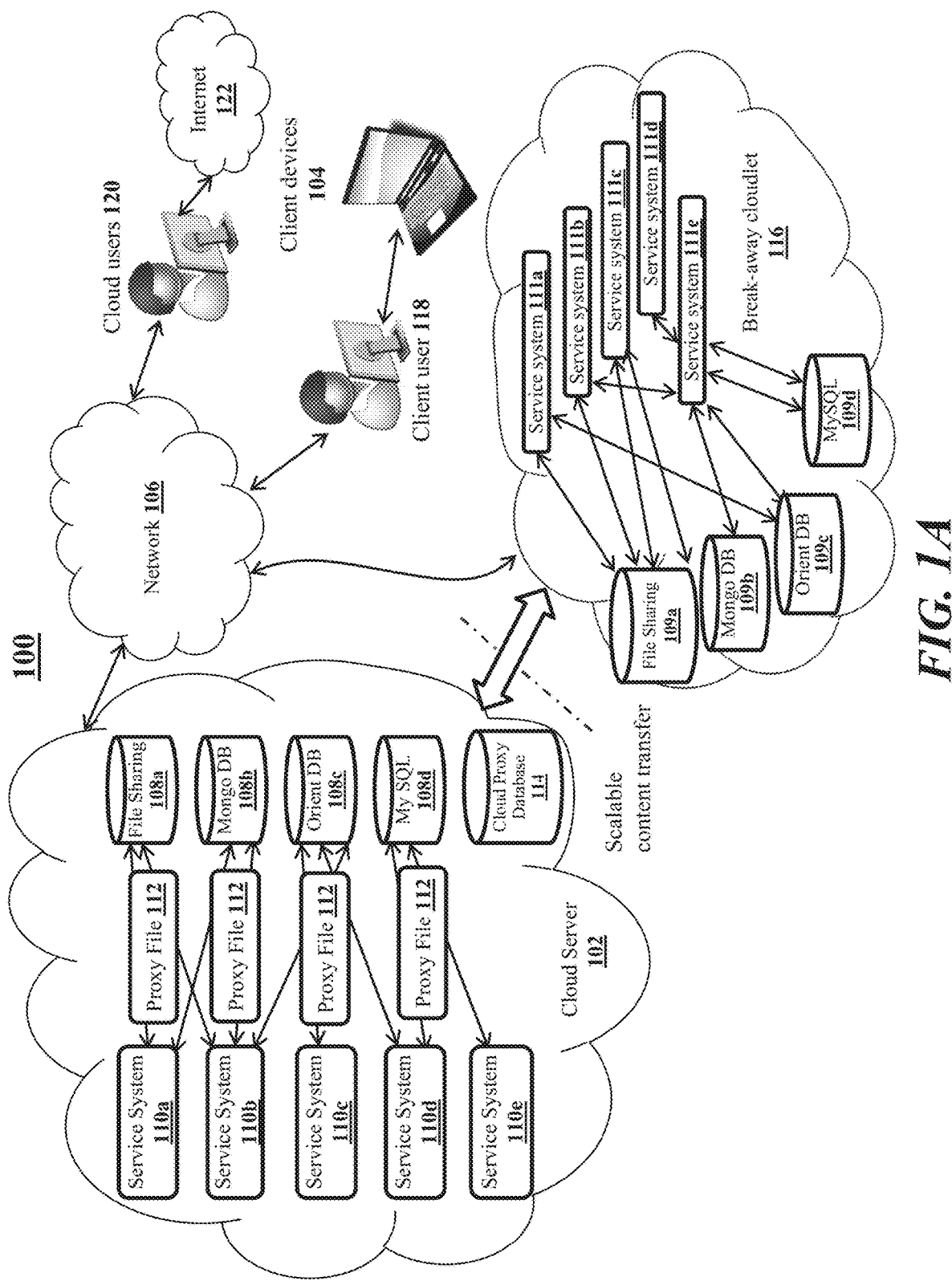
FIG. 1A illustrates synchronization process between devices of a cloud data synchronization system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein.

Cloud data synchronization system disclosed herein may include a cloud-based server system (located in a first location) and a client device (located in a second location) configured to have bi-directional data synchronization and re-synchronization of applications and records in databases using low bandwidth communication link. The continuous bi-directional synchronization and re-synchronization of records within the databases and applications of the cloud-based server system and the client device may occur when there is some network connectivity established and/or re-established between the cloud-based server system and the client device.

In one exemplary embodiment of the cloud data synchronization system, without limiting scope of other disclosed embodiments of the present disclosure, a cloud server may generate a mobile breakaway cloud node (cloudlet) of varying sizes where a copy and/or replica of a subset of applications and records of databases within a fixed cloud-based server system is provided. The cloud server may then upload the breakaway cloudlet to a client device and then link it with a client device. Users of the client device may make updates to a local copy of the subset of records and store the updates in a database of the client device while users of the fixed cloud-based server system may be simultaneously making updates to the same subset of records and storing the updates in databases on the fixed cloud-based server system.

Upon updating of the same or different data records at the fixed cloud-based server system and the client device by cloud users and client users respectively, one or more conflict instructions may be executed, and then one or more conflicts are automatically detected in updated subset of records in both the fixed cloud-based server system and the client device during synchronization and re-synchronization process of records between the fixed cloud-based server system and the client device. The conflicts may be associated with one or more fields of a same data file edited at both the fixed cloud-based server system and the client device by the cloud users and the client users respectively. Then, the system may determine whether the edits made in the same data file at the fixed cloud-based server system and/or the client device should be accepted based on one or more set of hierarchy rules defining a ranking hierarchy of users operating the fixed cloud-based server system and/or the client device making the edits. For instance, when a first user at the fixed cloud-based server system deletes a first data file and a second user at the client device updates the same first data file at the same or different time, then the system upon determining whether the first user or the second user has a higher ranking authority based on the hierarchy rules to make any changes to the first data file, changes made by either the first user or the second user to the first data file may be accepted. The system may then tag the accepted as well as not accepted edits/changes on the data file records, for instance as edited and/or inactive attributes respectively, in updated subset of records, in both the fixed cloud-based server system and the client device, during synchronization and re-synchronization process of records between the fixed cloud-based server system and the client device.

In some embodiments, a cloud data synchronization system may enable bi-directional data synchronization and re-synchronization of software applications and records in databases deployed in cloud-based server systems and client devices. The cloud data synchronization system may pre-position data objects replica at databases of each of geographically distributed client devices in a network by transferring data objects content from databases of origin cloud-based server systems to a number of client devices. The origin cloud-based server systems may be resident on a fixed location with access to continuous communication network. Depending upon bandwidth-constrained nature of the communication network environment between the origin cloud-based server systems and the client devices, selective transfer of the data objects content based on priority of data objects is accomplished such that the network load between the cloud-based server systems and the client devices is minimized.

In some embodiments, a cloud data synchronization system may enable bi-directional data synchronization and re-synchronization of software applications and records in databases deployed in cloud-based server systems and client devices. The cloud data synchronization system may execute a content selection technique configured to automatically generate a forecast and/or a prediction of a set of uniform resource locators (URLs) that may be visited by users of the client devices based upon an analysis of a history of past website/webpage accesses by the users of the client devices. A set of data objects referenced by the predicted URLs may then be determined from databases of the cloud-based server systems and replicated at databases of the client devices before a request to receive the data objects arrives at the cloud-based server systems from the users operating the client devices.

In some embodiments, a cloud data synchronization system may enable a user operating a remote client device (such as a mobile/laptop device) to download task-specific and/or mission-specific data sets from a cloud-based server system (located in a fixed location) to a database of the remote client device, and then use the cached and/or downloaded data sets independently on the remote client device when the remote client device is disconnected from a network connecting to the cloud-based server system. When connectivity to the cloud-based server system is re-established by the remote client device, for example, in an intermittent and bandwidth-limited communication network environment, the cloud-based server system then provides bi-directional data synchronization between records of the cloud-based server system and the remote client device to update the data sets on the cloud-based server system and the remote client device while operating in the intermittent and bandwidth-limited communication network environment.

In some embodiments, cloud data synchronization methods may enable bi-directional data synchronization between a cloud-based server system and a client device using a software-based end-to-end information pre-positioning software system, which will pre-position information data objects needed by users on the client device in an anticipatory manner. When the user may make a request to the cloud-based server system to receive task data, the information pre-positioning system delivers the requested information data objects from the cloud-based server system to the client device as if the client device were connected to the cloud-based server system even if the client device is not connected by a network to the cloud-based server system. The information pre-positioning system delivers the requested information data objects from the cloud-based server system to the client device based on execution of a set of intelligent data content selection techniques and a set of bandwidth-efficient content transfer techniques. The intelligent data content selection technique may accurately predict what information data objects must be pre-positioned at the client device. The bandwidth-efficient content transfer technique may include a collection of networking protocols and mechanisms, which minimizes traffic on bandwidth constrained satellite links connecting the client device to the cloud-based server system for synchronizing information data objects between the client device and the cloud-based server system. The information data objects may include contents of spatial, graph, and relational databases as well as files and web pages of the cloud-based server system.

In some embodiments, systems and methods may enable intelligent preposition, cache, and synchronization of data between cloud-based server systems located in a host country and client devices being operated in a foreign country in order to maintain task operations when communication channel networks are highly constrained or completely disconnected between the cloud-based server systems and the client devices. The systems and methods enable collection and transmission of data from the client devices operating in a field in a foreign country to the cloud-based server systems for processing and analyzing the collected data, and then transmitting information that is disseminated upon application of analytic processes on the collected data at the cloud-based server systems to users of the client devices. The systems and methods enable exchange of data between the cloud-based server systems and the client devices by intelligent caching and prioritization data techniques that allow bi-directional synchronization of the data between the cloud-based server systems and the client devices in disconnected, intermittent, and limited availability communications environments of the client devices.

In some embodiments, a cloud data synchronization system may include a software suite of tools that integrate seamlessly with existing web-based cloud applications. In operation of the system, client users operating client devices may receive one or more tasks from cloud users of cloud-based server systems, and when the client users perform task planning in their home location using task data obtained from the cloud-based server systems located in their home location, then the system may use proxy executable files of the cloud-based server systems that replicate data of the cloud-based server systems into one or more break-away cloudlets (nodes). The break-away cloudlets may be pre-configured to contain data sets for specific tasks or task locations for each client user profile of the system. The break-away cloudlets may contain task data sets that its associated client users are authorized to access, e.g., based on identify verification of the client users. The system may be configured to keep each break-away cloudlet updated with records for their specified data subset of their associated client user. When the client user move to a task location, the client user may take their break-away cloudlet along with them and link/attach their break-away cloudlet with their client device. While the client user is on the move, the break-away cloudlet of the client may contain networking hardware to allow the client users to connect to the cloud-based server systems so that task planning can continue using task data being obtained from the cloud-based server systems. When the client user arrive at the task location, then the client user may establish connection of the client device with the cloud-based server systems, and efficiently download latest updates to the task data in the break-away cloudlet linked to their client device. The system may utilize advanced routing mechanisms to optimize the network connection between the cloud-based server systems and the client device to get more updates to the task data in a faster time.

Figure 1B:
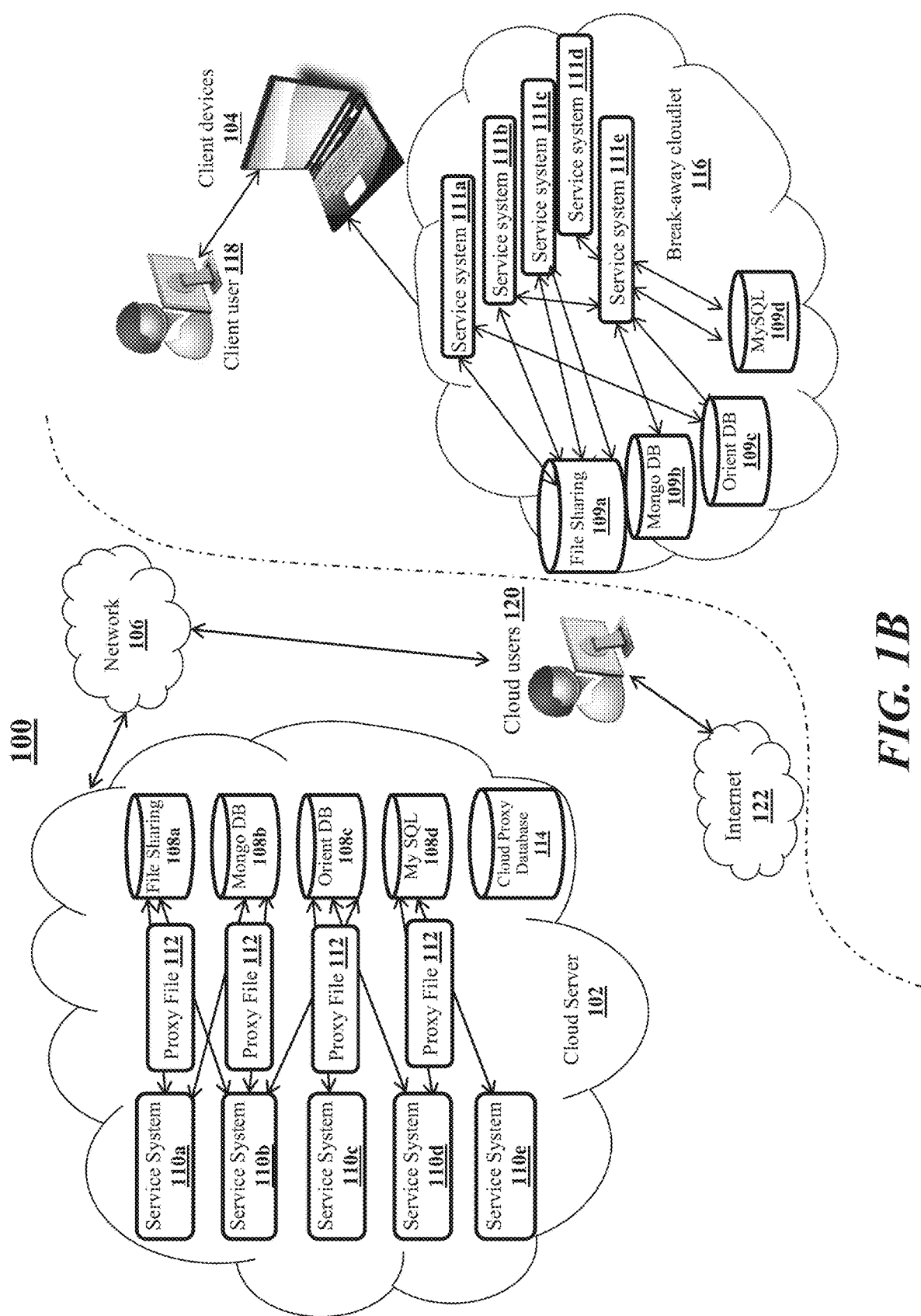
FIG. 1B illustrates arrangement of devices of a cloud data synchronization system when disconnected from each other, according to an exemplary embodiment.
Figure 1C:
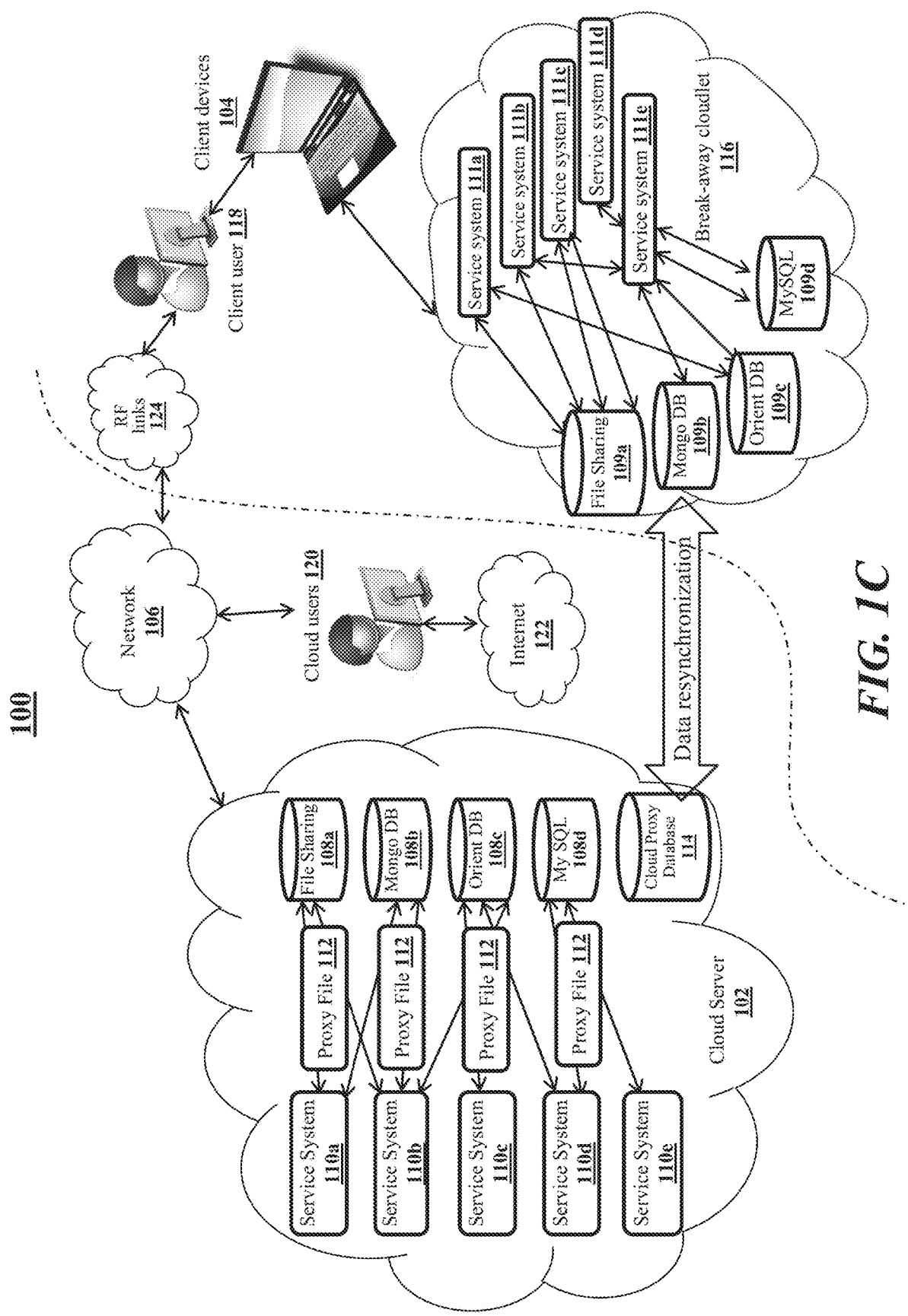
FIG. 1C illustrates re-synchronization process between devices of a cloud data synchronization system, according to an exemplary embodiment.

FIGS. 1A-1C illustrate components of a system 100 for cloud data synchronization, according to an exemplary embodiment. The system 100 may include cloud-based server systems 102 and client devices 104, which are configured to enable bi-directional data synchronization (as illustrated in FIG. 1A) and re-synchronization (as illustrated in FIG. 1C) to achieve accelerated content delivery between data records deployed at the cloud-based server systems 102 in a first location (for example, fixed location in a first country) and the client devices 104 located in a second location (for example, a second country environment with potentially disconnected, intermittent, and/or limited availability of communications).

The system 100 described herein operates in a cloud-computing environment where the client devices 104 are cloud-optimized and transmit a request for receiving data associated with one or more tasks to the cloud-based server systems 102. The client devices 104 data and application programs may be stored and executed on the cloud-based server systems 102 accessed over a network cloud. In the cloud computing environment, a web browser on the client devices 104 may interface with an application program that is executed on the cloud-based server systems 102. Through the browser on the client devices 104, a user may generate a request for receiving task data associated with the one or more tasks, and transmit the request to the cloud-based server systems 102 via the application program. In some embodiments, the system 100 described herein operate in a cloud computing environment where the client devices 104 may transmit to the cloud-based server systems 102 a request for receiving the task data associated with the one or more tasks. The data and application programs received from the cloud-based server systems 102 to the client devices 104 may be stored locally in the client devices 104 and executed on local computing resources of the client devices 104.

A cloud-based server system 102 may include one or more cloud databases 108 and one or more service system computers 110 being operated by one or more cloud users 120 over an Internet 122. The non-limiting examples of the one or more cloud databases 108 may include a file sharing database 108a, a mongo database 108b, an orient database 108c, and MySQL database 108d. One or more cloud application programs may be executed by the one or more service computers 110, and data associated with the one or more cloud application programs and one or more cloud tasks being executed at the one or more service computers 110 by the one or more cloud users 120 may be stored in the one or more cloud databases 108. The non-limiting examples of the one or more service computers 110 may include a service computer 110a, a service computer 110b, a service computer 110c, a service computer 110d, and a service computer 110e.

The cloud-based server system 102 may further include one or more cloud proxy executable files 112 and/or cloud proxy servers. In some embodiments, the one or more cloud proxy executable files 112 may be installed in an operating system of the one or more service computers 110. In some embodiments, the one or more cloud proxy executable files 112 may be installed in the one or more cloud databases 108. In some embodiments, the one or more cloud proxy executable files 112 may be interfaced between the one or more service computers 110 and the one or more cloud databases 108.

The one or more cloud proxy executable files 112 may be software components that may extend or enhance functionality supported by a browser and/or other software applications on the one or more cloud databases 108 and the one or more service computers 110 to track updates to records of the one or more cloud databases 108 and the one or more cloud application programs of the one or more service computers 110. The one or more cloud proxy executable files 112 may be loaded at a runtime of the one or more service computers 110. In some embodiments, the one or more cloud proxy executable files 112 may indicate that the one or more cloud proxy executable files 112 may handle and detect certain data content types through exposed file information at the cloud-based server system 102. If the browser and/or other software applications on the one or more cloud databases 108 and the one or more service computers 110 encounters such content type, the browser and/or other software applications on the one or more cloud databases 108 and the one or more service computers 110 may then load the associated cloud proxy executable files 112. In some embodiments, the browser and/or other software applications on the one or more cloud databases 108 and the one or more service computers 110 may set aside space within a browser content for the one or more cloud proxy executable files 112 to render itself and stream data accessed by the cloud user 120 to it. The one or more cloud proxy executable files 112 may then be responsible for rendering cloud user 120 operated data. The one or more cloud proxy executable files 112 may store all tracked transactions of the updates to the records of the data in the one or more cloud databases 108 and the one or more cloud application programs of the one or more service computers 110 in a cloud proxy database 114.

Client devices 104 may be any computing and/or telecommunications devices being operated by one or more client users 118. The client devices 104 may comprise a processor and are capable of performing various tasks and processes described herein, such as accessing external webservers and/or cloud-based server systems 102. The client devices 104 may provide a GUI interface to a client user 118 to interact with a customer-centric website hosted on the external webservers and/or the cloud-based server systems 102. Non-limiting examples of the client device 104 may include a telephone (e.g., POTS landline telephone, cellular telephone, smartphone), a client computer (e.g., desktop, laptop, server, tablet), or any other telecommunications or computing device used to communicate with the system 100 services.

The client device 104 may be associated with a client proxy database. In some embodiments, the client proxy database may be a break-away cloudlet 116. The break-away cloudlet 116 may be a data storage device configured to store a copy of records and/or applications/software codes contained within the cloud-based server systems 102. For instance, the break-away cloudlet 116 may include one or more cloud databases 109 and one or more service system computers 111 containing a copy of the records and/or applications/software codes contained within the one or more cloud databases 108 and one the or more service system computers 110. The non-limiting examples of the one or more cloud databases 109 may include a file sharing database 109*a*, a mongo database 109*b*, a orient database 109*c*, and MySQL database 109*d*. The non-limiting examples of the one or more service computers 111 may include a service computer 111*a*, a service computer 111*b*, a service computer 111*c*, a service computer 111*d*, and a service computer 111*e*.

The client device 104 may further include one or more client proxy executable files configured to track updates to data stored in the break-away cloudlet 116 upon execution of one or more client tasks by a processor of the client device 104. The one or more client proxy executable files may be software components that may extend or enhance functionality supported by a browser and/or other software applications on the client device 104 to track updates to records stored in the break-away cloudlet 116. The one or more client proxy executable files may be loaded at a runtime of the client device 104. In some embodiments, the one or more client proxy executable files may indicate that the one or more client proxy executable files may handle and detect certain content types through exposed file information at the client device 104. If the browser and/or other software applications on the client device 104 encounters such content type, the browser and/or other software applications on the client device 104 may then load the associated client proxy executable files. In some embodiments, the browser and/or other software applications on the client device 104 may set aside space within a browser content for the one or more client proxy executable files to render the browser content and stream data accessed by the client user 118 to it. The one or more client proxy executable files may then be responsible for rendering the client user 118 operated data. The one or more client proxy executable files may store all transactions of the updates to the records of the data in the break-away cloudlet 116 in a client proxy database.

Databases disclosed herein of the client device 104 and the cloud-based server system 102 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the client device 104 and/or the cloud-based server system 102. A memory of the databases may be a non-volatile storage device for storing data and instructions, to be used by a processor of the client device 104 and/or the cloud-based server system 102. The memory may be implemented with a magnetic disk drive, an optical disk drive, a solid-state device, or an attachment to network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. In some embodiments, a memory of the databases may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

The cloud-based server systems 102 and the client devices 104 may be configured to be connected to each other to exchange data through one or more communication network platforms 106. The examples of the communication network platform 106 may include, but are not limited to, private or public LAN, WLAN, MAN, WAN, and the Internet. The communication network platform 106 may include both wired and wireless communications according to one or more standards and/or via one or more transport mediums. The communication over the communication network platform 106 may be performed in accordance with various communication protocols such as Transmission Control Protocol and Internet Protocol (TCP/IP), User Datagram Protocol (UDP), and IEEE communication protocols. In one example, the communication network platform 106 may include wireless communications according to Bluetooth specification sets, or another standard or proprietary wireless communication protocol. In another example, the communication network platform 106 may also include communications over a cellular network, including, e.g. a GSM (Global System for Mobile Communications), CDMA (Code Division Multiple Access), EDGE (Enhanced Data for Global Evolution) network.

In operation, as illustrated in FIG. 1A, the client users 118 operating the client devices 104 may receive tasks from the cloud users 120 operating the cloud-based server systems 102. The client users 118 may then initiate a task planning and execution process on the client devices 104, using task data and applications obtained from the one or more cloud databases 108 and the one or more service system computers 110 of the cloud-based server systems 102 when connected to the cloud-based server systems 102 via the network 106. One or more proxy executable files 112 at the cloud-based server systems 102 may be configured to replicate task data and applications from the cloud-based server systems 102 into the break-away cloudlets 116. The break-away cloudlets 116 may be data storage devices such as a database, and configured to contain task data sets and applications for specific tasks or task locations of the client users 118. Once the client users 118 complete the planning for the task, or at least the task data required for the execution of the task is initially obtained from the cloud-based server systems 102 on the break-away cloudlets 116, which may be physically and/or electronically associated or linked with the client devices 104, then the client users 118 may depart for a task location to execute the task. In some instances, the client users 118 may continue the planning and/or execution of the task on the client devices 104 en route to the task location, but as illustrated in FIG. 1B, there may be no network 106 connectivity or very limited network 106 connectivity, so the client device 104 access to the cloud-based server systems 102 may be precluded. In such situations both the client users 118 operating the client devices 104 and the cloud users 120 operating the cloud-based server systems 102 may make one or more edits to local copies of same or different task data files at their respective locations. The client users 118 operating the client devices 104 and the cloud users 120 operating the cloud-based server systems 102 may not be aware about edits being made to same or different task data files since the cloud-based server system 102 and the client device 104 are disconnected to each other. Once the client user 118 reaches the task location, then a connectivity may be established by the client device 104 using a new network connection 124 (such as satellite or RF connection), as illustrated in FIG. 1C, and a limited communication connection to the cloud-based server systems 102 may be enabled, which may be a spotty, intermittent, and problematic connection. When the cloud-based server system 102 and the client device 104 are now connected again to each other, bi-directional data synchronization and re-synchronization between the cloud-based server system 102 and the client device 104 maybe be initiated so that any new task data or any updates to old task data made at either the cloud-based server system 102 and the client device 104 be shared between the cloud-based server system 102 and the client device 104. Any new task data or any updates to old task data made at either the cloud-based server system 102 and the client device 104 may be tagged by the cloud-based server system 102 and/or the client device 104 to indicate information about the edits and who made the edits and/or marked by the cloud-based server system 102 and/or the client device 104 to indicate a current status (such as an active attribute or an inactive attribute), and then the tagged and/or marked updated task data files will be shared between the cloud-based server system 102 and the client device 104 so that users of the cloud-based server system 102 and the client device 104 may be able to tagged and/or marked information to easily identify the new task data or any updates to old task data among all the task data they have.

The bi-directional data synchronization and re-synchronization between the cloud-based server system 102 and the client device 104 maybe be enabled and initiated because of execution of a data synchronization software application product installed in an operating system of devices of the cloud-based server system 102 and the client device 104. The cloud-based server system 102 may have a collection of hub content nodes (HCNs) and the client device 104 may have a local content node (LCN) with a storage capacity, for example, of several terabytes, and the data synchronization software application product being executed on the LCNs of the client device 104 and the HCNs of the cloud-based server system 102 may be composed of several elements, including but not limited to, an anticipatory information store (AIS), a scalable content transfer service (SCoTS), and a network sensing service (NSS) to enable and achieve the bi-directional data synchronization and re-synchronization between the cloud-based server system 102 and the client device 104.

An AIS element of the data synchronization software application product may be resident on the cloud-based server system 102 and the client device 104. In some embodiments, the AIS element of the data synchronization software application product may be resident on each LCN of the client device 104. The LCN may correspond to a hypertext transfer protocol (HTTP) or a file transfer protocol (FTP) proxy server through which the client device 104 web browsers forward all web related requests to external web servers and/or the cloud-based server system 102. The AIS element of the data synchronization software application product may be configured to provide a proxy web service to the client users 118 of the client device 104, and further serve as a repository or cache of data objects that the AIS element may preposition in anticipation of future web requests of the client user 118 associated with the task data and originating from the client device 104.

The AIS element of the data synchronization software application product may accomplish task data pre-positioning capability by executing an intelligent content selection program and/or technique on the client device 104. The intelligent content selection program and/or technique may be executed on each LCN of the client device 104 to continuously monitor all web accesses made by the client user 118 on a LAN associated with the client device 104. The intelligent content selection program and/or technique, based upon an analysis of past URL access patterns of the client user 118 on the client device 104, may predict a set of URLs that may be accessed by the client user 118 on the client device 104 in the future.

In operation, when the client user 118 of the client device 104 engage to access web information and/or task data records, the intelligent content selection program and/or technique may predict a list of web sites and a list of data records visited by the client user 118 on the client device 104 along with values for time intervals between successive web sites visits from a local web access log of the client device 104. Then, the intelligent content selection program and/or technique, in order to determine a prediction of which URLs are within a top level web page that the client user 118 is likely to access on the client device 104, the intelligent content selection program and/or technique may implement one or more learning techniques for analyzing content of the web page and/or task data records on the client device 104 to learn the client user 118 selection patterns within the web page and/or task data records. For instance, the intelligent content selection program and/or technique may employ and execute an embedded statistical learning mechanism on the client device 104 that will continuously analyze a history of past requests of the client user 118 on a LAN of the client device 104 to automatically derive a subscription profile of the client user 118 of the client device 104. The subscription profile of the client user 118 may contain a predicted uniform resource locator (URL) accesses for the client user 118 on the client device 104 including a predicted frequency of each URL access made on the client device 104.

In some embodiments, URLs within web pages being accessed by the client user 118 on the client device 104 may be associated with a descriptive text. In such instances, the intelligent content selection program and/or technique may execute a statistical learning based text feature extraction and classification algorithm. A non-limiting example of the statistical learning based text feature extraction and classification algorithm may include a Sparse Binary Polynomial Hashing (SPBH) Markov technique for predicting URLs that may be accessed by the client user 118 on the client device 104 based upon previous history of web pages being accessed on the client device 104. The SPBH technique may automatically classify data associated with previous history of web pages as spam or non-spam in real-time and with high accuracy. The SPBH technique may further be applied to classify URLs determined based upon previous history of web pages being accessed on the client device 104 within a top level web page pre-fetched by the LCN of the client device 104 as "desired" or "not-desired". The LCN of the client device 104 may then subscribe to the desired URLs and preposition them in a local client database. In some alternate embodiments, besides statistical learning, the intelligent content selection program and/or technique may also execute web page mining techniques to augment an operation of detecting all web (or FTP) accesses made by the client user 118 on a LAN associated with the client device 104.

In some embodiments, for hypertext markup language (HTML) or extensible markup language (XML) data objects on the client device 104, such as web pages and news feeds, the intelligent content selection program and/or technique may enable anticipatory caching of the data objects on the client device 104 beyond a single link depth. In other words, the intelligent content selection program and/or technique will not only predict the URL of the data objects accessed via the client device 104 but also a subset of URLs within a pre-positioned HTML or XML web page that may be accessed by the client user 118 on the client device 104 before the client user 118 retrieves a top level web page on the client device 104, and thereby enabling anticipatory caching of HTML/XML data objects beyond a single link depth.

In order to generate algorithms for mining of HTML documents on the client device 104, the intelligent content selection program and/or technique may be configured to take into consideration multiple different paradigms such as syntax analysis, wrapper production, mining algorithms, and hybrid algorithms. A syntax analysis may be configured to work based on a pattern recognition and definition for an internal syntactical structure of the HTML document on the client device 104. A wrapper production may be configured to rely on a development of intelligent software programs for extracting data from a web page being accessed on the client device 104. The intelligent software programs may be called as wrappers and are custom-made to extract data from specific web pages being accessed on the client device 104. A mining algorithm may be configured to employ several programs for identifying specific features in an HTML document on the client device 104. The application of the mining algorithms in the HTML document on the client device 104 may provide filtering of information on the HTML document in a constricted manner. A hybrid algorithm may utilize a combination of all or a subset of the paradigms such as the syntax analysis, the wrapper production, and the mining algorithm for securing better mining results. The hybrid algorithm may take advantage of attributes of all three paradigms such as the syntax analysis, the wrapper production, and mining algorithms during operation.

A scalable content transfer service (SCoTS) element of the data synchronization software application product consists of distributed software components executing on the client device 104 and the cloud-based server system 102. In some embodiments, the scalable content transfer service (SCoTS) element of the data synchronization software application product consists of distributed software components executing on the LCNs of the client device 104 and the HCNs of the cloud-based server system 102. The SCoTS element may be configured to enable transportation of data objects from source nodes, the one or more cloud databases 108, and the cloud proxy database 114 on the cloud-based server system 102 to the LCNs of the client device 104 that have registered their task data information needs with the SCoTS element. In some embodiments, the SCoTS element may be configured to enable transportation of data objects from the LCNs of the client device 104 to the one or more cloud databases 108 on the cloud-based server system 102.

The SCoTS element may be configured to calculate a bandwidth value available for the network 106 and/or the satellite link 124 between the cloud-based server system 102 and the client device 104 to enable transportation of data objects between the cloud-based server system 102 and the client device 104. Upon the calculation of the bandwidth value, the SCoTS element may compare the calculated bandwidth value with a pre-determined value of the acceptable bandwidth for each of the network 106 and/or the satellite link 124. Based upon the comparison, when the SCoTS element determines that calculated bandwidth value is low at least for one of the network 106 and/or the satellite link 124, then in order to minimize data traffic load on bandwidth-constrained links of the network 106 and/or the satellite link 124 between the cloud-based server system 102 and the client device 104, the SCoTS element may perform multiple actions. Firstly, the SCoTS element may reduce a number of traversals of a subscribed data object over the network 106 and/or the satellite link 124 connecting the cloud-based server system 102 and the client device 104 to minimum possible value. For instance, only one copy of the data object produced by the one or more service system computers 110 on the cloud-based server system 102 and subscribed to by the client user 118 on the client device 104 LAN may traverse the network 106 and/or the satellite link 124 irrespective of a number of client users 118 of the client device 104. Secondly, the SCoTS element may execute one or more data compression techniques to reduce a volume of data traffic transported over the network 106 and/or the satellite link 124 between the cloud-based server system 102 and the client device 104.

One or more data compression techniques that may be executed by the SCoTS element within the LCNs of the remote client devices 104 and the HCNs of the cloud-based server systems 102 may help to achieve maximum transfer of data and thereby having an intelligent content distribution between the cloud-based server system 102 and the client device 104 when the bandwidth of the network 106 and/or the satellite link 124 is limited.

One non-limiting example of a data compression technique may be an object differencing technique, which may be executed by the SCoTS element within the LCNs of the client device 104 and the HCNs of the cloud-based server system 102. Upon the execution of the object differencing technique, when the HCNs of the cloud-based server system 102 determines that a new data object that is being transmitted and/or pushed to the LCNs of the client device 104 is an updated version of a previously sent same data object, then the object differencing technique may invoke a differencing algorithm that may determine a difference between the two versions of the same data object. A differencing processor engine of the object differencing technique may then generate a difference data object stream at the cloud-based server system 102, which may be transmitted the LCNs of the client device 104 and thereby significantly reducing total amount of data transmitted over the network 106 and/or the satellite link 124 from the cloud-based server system 102 to the LCNs of the client device 104. The difference data object stream received at the client device 104 may consist of a sequence of copy and insert commands, which may be used by the client user 118 of the client device 104 along with original data object to create a new and updated data object at the client device 104.

Another non-limiting example of a data compression technique may be a schema aware XML compression technique, which may be executed by the SCoTS element within the LCNs of the client device 104 and the HCNs of the cloud-based server system 102. The schema aware compression scheme consists of a schema based encoding scheme where the selected data elements inside an XML document on the cloud-based server system 102 and/or the client device 104 are translated into binary form. Upon the execution of the schema aware XML compression technique, XML element names of the document object on the cloud-based server system 102 and/or the client device 104 may be replaced by shorter size binary strings.

Another non-limiting example of a data compression technique may be a XML Inter-Document Redundancy Compression (IRDC) technique, which may be executed by the SCoTS element within the LCNs of the client device 104 and the HCNs of the cloud-based server system 102. The IRDC technique may provide a mechanism for end to end network points to avoid sending redundant XML fragments from the cloud-based server system 102 to the client device 104 over a series of document data transfers. A sequence of steps may be executed during the IRDC process. In a first step, the data compression technique may execute instructions for the XML document to be read into a memory. Then a DOM data structure is created from the xml document. In the next step, the data compression technique may execute instructions to construct a hash tree structure from the DOM model. A corresponding hash tree node for every DOM model node is then generated except for attribute nodes. The attributes may be represented inside a hash tree node. The hash tree node may comprise an element name, element value, references to child nodes, attribute names, attribute values, and a hash code. The hash code corresponds to a hash function that takes in as parameters node's element name, element value, attribute names, attribute values, and the hash code of each of its child. In a next step, the data compression technique may execute instructions recursively traverse a XML hash tree. At each point, a hash value of the XML hash tree is checked against a hash table of entries. If there is a hash value match, then the data compression technique may execute instructions to make a check of each of the node elements against the hash table entries match. If the node has child nodes, then each of the child nodes are recursively checked. If a match is found, the hash node is replaced by a cache node within the XML hash tree. A cache node may contain a hash value and a collision index of the table entry. If the node's hash value does not match any of the table entries, or if there was a hash function collision, a new table entry is then created and added to the hash table of entries. In a next step, the data compression technique may execute instructions to encode back a XML hash tree with multiple cache nodes into a XML document by recursively traversing the XML hash tree. Every cache node encountered though, will insert a cache tag along with the hash value and a collision index as element values. The cache encoded XML document is then written back to a data file. In some embodiments, a XML hash tree may be traversed recursively. If the hash tree node is not a cache node, a table entry is created and the hash tree node is inserted into the table. If a cache node element is encountered, the hash code value along with the collision index value is then used to find the xml hash tree node. The cache node is then replaced by a corresponding xml hash tree node. The XML hast tree is now decoded back to an original XML document.

A NSS element of the software application program product may consist of software components distributed across the LCNs of the client device 104 and the HCNs of the cloud-based server system 102. The NSS element may automatically detect and generate a location data of the client device 104 and the cloud-based server system 102 using one or more location identification applications such as GPS and location sensor based applications, and a network connectivity information of the network 106 and/or the satellite link 124 between the cloud-based server system 102 and the client device 104 needed by the SCoTS function to enable transportation of data objects from source nodes, the one or more cloud databases 108, and the cloud proxy database 114 on the cloud-based server system 102 to the LCNs of the client device 104. In some embodiments, the NSS element may be configured to calculate a bandwidth value available for the network 106 and/or the satellite link 124 between the cloud-based server system 102 and the client device 104, and then transmit the bandwidth value to the SCoTS element to make selection and compression of data objects from the cloud-based server system 102 based on the bandwidth value, and then transport the selected and compressed data objects to the client device 104.

Systems and methods for cloud data synchronization described herein provide several advantages such as an ability to provide a complete end-to-end solution for accelerating web content delivery between cloud servers and devices of the cloud-based server system 102 and a client device 104 located in a disconnected, intermittent, and/or limited availability communications environment. The systems and the methods disclosed herein are able to enable continuous bi-directional synchronization and re-synchronization of records within the cloud-based server system 102 and the client device 104 by implementing a cost effective data synchronization software application product being executed on hardware platforms of the cloud-based server system 102 and the client device 104 that may run on a network edge oriented system architecture.

Another advantage may be that an architecture of the data synchronization software application product being executed on hardware platforms of the cloud-based server system 102 and the client device 104 may be scalable in terms of a numbers of LCNs that can be accommodated within the system 100, a number of client users 118 that can be served by each LCN, as well the size of data objects that can be accessed by the client users 118 on the client devices 104, for example, ranging from a few kilobytes to gigabytes. The data synchronization software application product may have a network edge oriented nature, which will enable the data synchronization software application product to work in a secure networking environment with inline network encryptors situated at the network 106 and/or the satellite link 124. Additionally, the data synchronization software application product may provide a plug-and-play capability for the client users 118 and thereby requiring a minimal effort to operate the client device 104 in a remote field location.

FIG. 2 shows execution steps of transmission of data from a cloud server to a client device, according to an exemplary method 200. The exemplary method 200 shown in FIG. 2 comprises execution steps 202, 204, 206, 208, 210, and 212. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer, referred to as a cloud server having one or more processors in this exemplary embodiment. However, one having skill in the art will appreciate that, in some embodiments, steps may be executed by any number of computing devices operating in a distributed cloud computing environment. In some cases, a server computer executing one or more steps may be programmed to execute various other, unrelated features, where such server computer does not need to be operating strictly as the cloud server described herein.

At step 202, a cloud server may generate a breakaway cloudlet comprising a client copy and/or replica of records contained within one or more cloud databases and one or more cloud application programs associated with one or more service computing systems of the cloud server. In some embodiments, the cloud server may initially select one or more records associated with a particular client identifier from all the records of all clients (or client users) contained within the one or more cloud databases and the one or more cloud application programs associated with the one or more service systems. The client identifier for each client may include a client name, information associated with client devices of the client, a client unique identification number, and/or any information that may be used to uniquely identify the client and the client devices of the client. The client identifier data for all the clients may be stored in a database, and retrieved by the cloud server to then identify the one or more records associated with a particular client identifier.

The cloud server generates a breakaway cloudlet comprising the copy/replica of the identified records associated with the particular client identifier, and uploads the breakaway cloudlet comprising the generated copy/replica of the selected records to a database and/or a cloudlet node associated with the client device associated with the particular client identifier. In some embodiments, the cloud server may first establish a communications link/channel in a network to connect with the client device in order to have a secure transportation channel to transmit the breakaway cloudlet comprising the generated copy/replica of the identified records to the client device. Prior to the cloud server establishing the communications link/channel in the network with the client device, the cloud server verifies identification information of the client device using with a client device identifier linked to the client identifier stored within the database.

At step 204, users (or cloud users) of a cloud server may execute one or more cloud tasks using the one or more service computing systems over the Internet. The non-limiting examples of the one or more cloud tasks may correspond to updating a software application or editing a text file. Upon the execution of the one or more cloud tasks, records contained within the one or more cloud databases and the one or more cloud application programs associated with the one or more service systems may be updated. In some embodiments, when the records contained within the one or more cloud databases and the one or more cloud application programs associated with the one or more service systems are updated based upon the execution of the one or more cloud tasks, the updates to the record may be flagged, tagged, and/or marked.

In one example, upon the execution of the one or more cloud tasks such as generating a new text document and storing the new text document in the one or more cloud databases, the records of the one or more cloud databases may be updated since a new text document has been added in repository of the one or more cloud databases. The new text document may then be flagged, tagged, and/or marked by the cloud server as a new file, a high priority file, or an active document.

In another example, upon the execution of the one or more cloud tasks such as modifying information in an existing text document stored in the one or more cloud databases, the records of the one or more cloud databases may be updated since new information has been added or deleted in the existing text document stored in the one or more cloud databases. The modified text document may then be flagged, tagged, and/or marked by the cloud server as a modified file or an active document.

In yet another example, upon the execution of the one or more cloud tasks such as updating a video editor or any software application of the one or more cloud application programs stored in the one or more cloud databases, the records of the one or more cloud databases may be updated since a new version of the video editor software application has been added and/or an older version of the video editor software application has been deleted from the cloud application programs stored in the one or more cloud databases. The new version of the video editor software application may then be flagged, tagged, and/or marked by the cloud server as a new file or an active document, whereas the deleted version of the video editor software application may then be flagged, tagged, and/or marked by the cloud server as an inactive document. In some instances, a cloud server may not delete a data file or postpone the deletion of the data file upon execution of the cloud tasks, and the data file that has to be deleted and/or replaced as a result of the execution of the cloud task maybe flagged as "to be deleted" or "inactive".

At step 206, a cloud server may track the updates to the records of the one or more cloud databases and the one or more cloud application programs of the cloud server in one or more transaction log files. The updates to the records may correspond to addition of new data files/applications, modification of existing data files/applications, and/or deletion of existing data files/applications. In some embodiments, the cloud server may track the updates to the records of the one or more cloud databases and the one or more cloud application programs upon execution of one or more cloud proxy executable files. In some embodiments, the one or more cloud proxy executable files may be software products installed within the one or more cloud databases, and are configured to detect and record any changes in content stored within the one or more cloud databases. In some embodiments, the one or more cloud proxy executable files may be installed in the one or more service computing systems of the cloud server, and are configured to detect and record any operations performed on the one or more service computing systems by users of the cloud server. In some embodiments, the one or more cloud proxy executable files may be external servers that are interfaced between the one or more service computing systems and the one or more cloud databases, and are configured to detect and record any transfer of data between the one or more service computing systems and the one or more cloud databases. The one or more cloud proxy executable files may record and/or store all transactions of the data updates to the records of the one or more cloud databases and the one or more application programs in a cloud proxy database. The transactions of the data updates in one or more transaction log files may correspond to information regarding one or more new features added in existing data files/applications and/or deleted in existing data files/applications. The transactions of the data updates in one or more transaction log files may further correspond to information regarding one or more users who added or deleted one or more features in existing data files/applications. The transactions of the data updates in one or more transaction log files may further correspond to information regarding a date and a time at which the one or more users added or deleted one or more features in existing data files/applications.

At step 208, a cloud server may categorize the data updates to the records of the one or more cloud databases and the one or more application programs stored in the cloud proxy database for each client. The cloud server may categorize the data updates for each client by selecting the data updates for each client based on the client identifier associated with each client. For instance, the cloud server may query a database to determine a set of selection criteria associated with the client device identifier. In some embodiments, the database may store a plurality of selection criteria associated with a plurality of client device identifiers of a plurality of client devices. The cloud server may then determine the set of selection criteria associated with the client device identifier of the client device, and apply the set of selection criteria to categorize the data updates to the records of the one or more cloud databases and the one or more application programs stored in the cloud proxy database for the client associated with the client device identifier. The cloud server may then assign priority to the data updates for each client based on the set of selection criteria and other information obtained about the client associated with the client identifier. The set of selection criteria and other information stored in the data for each client may include, but not limited to, a job profile of the client, a client devices of the client, a current location of the client where the client is operating the client device, one or more tasks currently being worked upon by the client, information requested by the client, recent web history of the client device, and one or more software applications installed on the client device.

In some embodiments, a cloud server may assign a priority rank to the multiple categories of the data updates for each client. For instance, the cloud server may select a first subset of data updates for a particular client and a second subset of data updates for the particular client, and then assign a first priority to the first subset of data updates and a second priority to the second subset of data updates based upon the set of selection criteria associated with the client device identifier. In one non-limiting example case, the cloud server may determine a priority for the first subset of data updates and the second subset of data updates based on information associated with a current mission task of the client operating the client device at a remote location. The cloud server may query the database storing client profiles to determine the mission tasks associated with the client identifier of the particular client. In another non-limiting example case, the cloud server may determine a priority for the first subset of data updates and the second subset of data updates based on a history of recent data accessed by the client on the client device. For instance, when the cloud server determines that recently the client was regularly accessing information associated with weather data and map data for long periods of time, then the cloud server may assign a top priority to any of the set of data updates associated with the weather data and/or the map data.

At step 210, a cloud server may transmit a request for a secure connection via a communications link/channel in a network to the client device. The cloud server upon receiving an affirmative confirmation regarding the secure connection request from the client device then establishes the communications channel network to connect with the client device. The cloud server upon establishing the communications link/channel in the network with the client device, then determines a type, a speed, a quality, and a bandwidth of the communications channel network. The cloud server may execute one or more techniques in order to continuously determine the speed, the quality, and the bandwidth of the communications channel network connecting to the client device for the duration of the connection.

At step 212, a cloud server may transmit the first subset of data updates and the second subset of data updates to the client device in determined order of priority. In some embodiments, the cloud server may transmit the first subset of data updates and the second subset of data updates to the client device in the order of priority determined based on the bandwidth value of the communications link/channel in the network available for transmission to the client device. In some embodiments, the cloud server may execute instructions to compress size of files of the first subset of data updates and the second subset of data updates and then transmit the first subset of data updates and the second subset of data updates to the client device in order of priority determined based on the bandwidth value of the communications link/channel in the network available for transmission to the client device.

In some embodiments, the cloud server may transmit the first subset of data updates ahead of the second subset of data updates to the client device upon determining that the value of the bandwidth of the communications link/channel in the network available for transmission to the client device is below a pre-determined threshold value where the first priority of the first subset of data updates is higher than the second priority of the second subset of data updates. The cloud server may determine the pre-determined threshold value associated with the communications link/channel in the network stored in the database, and then compare the pre-determined threshold value with the determined bandwidth value of the communications channel network available for transmission to the client device. The cloud server may transmit the first subset of data updates ahead of the second subset of data updates to the client device because the first priority of the first subset of data updates is higher than the second priority of the second subset of data updates and there may be only be limited bandwidth available because of which it may be possible that not all of the data updates are transmitted to the client device in limited time.

In some embodiments, a cloud server may transmit only a first subset of data updates to the client device upon determining that the value of the bandwidth of the communications link/channel in the network available for transmission to the client device is such that only a portion of the total transaction data updates stored in the cloud proxy database can be transmitted to the client device where the first priority of the first subset of data updates is higher than all remaining data updates. In some embodiments, the cloud server may first compress the size of the first subset of data updates depending on the value of the bandwidth of the communications link/channel in the network available for transmission to the client device, and then transmit the compressed format of the first subset of data updates to the client device.

In some embodiments, a cloud server may configured to transmit all of the transaction data updates of the cloud server to the client device upon determining that the value of the bandwidth of the communications link/channel in the network available for transmission to the client device is greater than a pre-determined threshold value. The cloud server may determine the pre-determined threshold value associated with the communications link/channel in the network stored in the database, and then compare the pre-determined threshold value with the determined bandwidth value of the communications link/channel in the network available for transmission to the client device.

In some embodiments, a cloud server may transmit the first subset of data updates and the second subset of data updates to the client device in order of priority determined based on a type of the communications link/channel in the network connecting the client device and the cloud server. The cloud server may determine information about the type of the communications link/channel in the network from the database, and then based on the type of the network, the cloud server may then determine the order of priority for all sets of data updates and subsequently transmit the first subset of data updates and/or the second subset of data updates to the client device in the determined order of priority.

In some embodiments, a cloud server may transmit the first subset of data updates and the second subset of data updates to the client device in order of priority determined based on a speed and a quality of transmission available for the communications link/channel in the network connecting the client device and the cloud server. The cloud server may determine information about the speed and the quality of the communications link/channel in the network from the database, and then based on the speed and the quality of the network, the cloud server may then determine the order of priority for all sets of data updates and subsequently transmit the first subset of data updates and/or the second subset of data updates to the client device in the determined order of priority.

Figure 3:
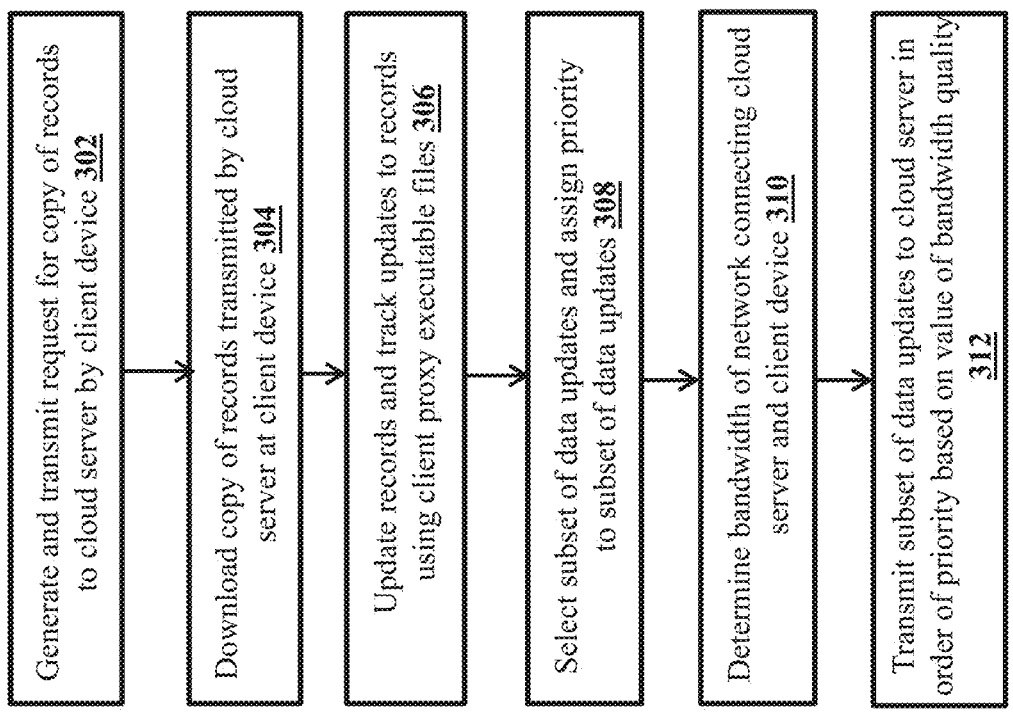
FIG. 3 illustrates execution of a method for transmission of data from a client device to a cloud server, according to an exemplary embodiment.

FIG. 3 shows execution steps for transmission of data from a remote client device to a cloud server, according to an exemplary method 300. The exemplary method 300 shown in FIG. 3 comprises execution steps 302, 304, 306, 308, 310, and 312. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 300 of FIG. 3 is described as being executed by a single client computer, referred to as a client device in this exemplary embodiment. However, one having skill in the art will appreciate that, in some embodiments, steps may be executed by any number of client computing devices operating in a distributed cloud computing environment. In some cases, a client computer executing one or more steps may be programmed to execute various other, unrelated features, where such client computer does not need to be operating strictly as the client device described herein.

At step 302, a client device may generate a request to receive a breakaway cloudlet comprising a copy and/or replica of records contained within one or more cloud databases and one or more cloud application programs associated with one or more service systems of a cloud server. Upon the generation of the request, the client device is then configured to transmit the generated request to the cloud server. The client device may initiate a secure communication link with the cloud server for securely transmitting the request. The request from the client device to the cloud server may include a client device identifier containing identification information associated with the client and a client device. The client device may store its client device identifier in a client database.

At step 304, a client device may download the breakaway cloudlet comprising the copy of records of the one or more cloud databases and the one or more cloud application programs received from the cloud server. In some embodiments, upon the receipt of the request from the client device, the cloud device may generate the breakaway cloudlet comprising the copy and/or replica of records. The cloud server may initially select one or more records associated with the client identifier received from the client device from all the records of all clients (or client users) contained within the one or more cloud databases. The cloud server then generates a breakaway cloudlet comprising the copy/replica of the identified records associated with the client identifier, and transmit the generated copy/replica of the selected records to a database and/or a cloudlet node associated with the client device associated with the client identifier. The client device downloads the received records and store the copy of records of the one or more cloud databases and the one or more cloud application programs in a client proxy database.

At step 306, a client device may update to the copy of records of the one or more cloud databases and the one or more cloud application programs stored in the client proxy database based on execution of one or more client tasks in the client device. The non-limiting examples of the one or more client tasks may correspond to updating a software application or editing a text file. Upon the execution of the one or more client tasks, records contained within the client proxy databases may be updated. In one example, upon the execution of the one or more client tasks such as generating a new text document and storing the new text document in the client proxy database, the records of the client proxy database may be updated since a new text document has been added in repository of the client proxy database. In another example, upon the execution of the one or more client tasks such as modifying information in an existing text document stored in the client proxy database, the records of the client proxy database may be updated since new information has been added or deleted in the existing text document stored in the client proxy database. In yet another example, upon the execution of the one or more client tasks such as updating a video editor or any software application stored in the client proxy database, the records of the client proxy database may be updated since a new version of the video editor software application has been added and/or an older version of the video editor software application has been deleted from the client proxy database.

The client device may further track the updates to the records of the client proxy database in one or more transaction log files. The updates to the records may correspond to addition of new data files/applications, modification of existing data files/applications, and/or deletion of existing data files/applications. In some embodiments, the client device may track the updates to the records of the client proxy database upon execution of one or more client proxy executable files. In some embodiments, the one or more client proxy executable files may be software products installed within the client proxy database, and are configured to detect and record any changes in content stored within the client proxy database. In some embodiments, the one or more client proxy executable files may be installed in the operating system of the client device, and are configured to detect and record any operations performed on the client device. In some embodiments, the one or more client proxy executable files may be external servers that are interfaced between the client proxy database and the client device, and are configured to detect and record any modification of data in the client proxy database. The one or more client proxy executable files may record and/or store all transactions of the data updates in the one or more transaction log files in a separate database or within a portion of the client proxy database. The transactions of the data updates to the records may correspond to information regarding one or more new features added in existing data files/applications and/or deleted in existing data files/applications. The transactions of the data updates to the records may further correspond to information regarding one or more client users who added or deleted one or more features in existing data files/applications. The transactions of the data updates to the records may further correspond to information regarding a date and a time at which the one or more client users added or deleted one or more features in existing data files/applications.

At step 308, a client device may select a first subset of data updates with a first priority and a second subset of data updates with a second priority stored in the client proxy database. The client device is further configured to assign the first priority to the first subset of data updates and the second priority to the second subset of data updates based upon application of a set of selection criteria associated with its client device identifier on transaction data stored within the client proxy database. In some embodiments, any database may store the set of selection criteria. In one non-limiting example case, the client device may determine a priority for the first subset of data updates and the second subset of data updates based on information associated with a current mission task of the client operating the client device at a remote location.

At step 310, a client device may transmit a request for a secure connection via a communications link/channel in a network to the cloud server. The client server upon receiving an affirmative confirmation regarding the secure connection request from the cloud server then establishes the communications link/channel in the network to connect with the cloud server. The client device upon establishing the communications link/channel in the network with the cloud server, then determines a type, a speed, a quality, and a bandwidth of the communications link/channel in the network. The client device may execute one or more techniques in order to continuously determine the speed, the quality, and the bandwidth of the communications link/channel in the network connecting to the cloud server for the duration of the connection.

At step 312, a client device may transmit the first subset of data updates and the second subset of data updates to the cloud server in the determined order of priority. In some embodiments, the client device may transmit the first subset of data updates and the second subset of data updates to the cloud server in the order of priority determined based on the bandwidth value of the communications link/channel in the network available for transmission to the cloud server. In some embodiments, the client device may execute instructions to compress size of files of the first subset of data updates and the second subset of data updates and then transmit the first subset of data updates and the second subset of data updates to the cloud server in order of priority determined based on the bandwidth value of the communications link/channel in the network available for transmission to the cloud server.

In some embodiments, the client device may transmit the first subset of data updates ahead of the second subset of data updates to the client device upon determining that the value of the bandwidth of the communications link/channel in the network available for transmission to the cloud server is below a pre-determined threshold value where the first priority of the first subset of data updates is higher than the second priority of the second subset of data updates. The client device may determine the pre-determined threshold value associated with the communications link/channel in the network stored in the database, and then compare the pre-determined threshold value with the determined bandwidth value of the communications link/channel in the network available for transmission to the cloud server. The client device may transmit the first subset of data updates ahead of the second subset of data updates to the cloud server because the first priority of the first subset of data updates is higher than the second priority of the second subset of data updates and there may be only be limited bandwidth available because of which it may be possible that not all of the data updates are transmitted to the cloud server in limited time.

In some embodiments, a client device may transmit only a first subset of data updates to the cloud server upon determining that the value of the bandwidth of the communications link/channel in the network available for transmission to the cloud server is such that only a portion of the total transaction data updates stored in the client proxy database can be transmitted to the cloud server where the first priority of the first subset of data updates is higher than all remaining data updates. In some embodiments, the client device may first compress the size of the first subset of data updates depending on the value of the bandwidth of the communications link/channel in the network available for transmission to the cloud server, and then transmit the compressed format of the first subset of data updates to the cloud server.

In some embodiments, a client device may transmit all of the transaction data updates to the cloud server upon determining that the value of the bandwidth of the communications link/channel in the network available for transmission to the cloud server is greater than a pre-determined threshold value. The client device may determine the pre-determined threshold value associated with the communications link/channel in the network stored in the database, and then compare the pre-determined threshold value with the determined bandwidth value of the communications link/channel in the network available for transmission to the cloud server.

In some embodiments, a client device may transmit the first subset of data updates and the second subset of data updates to the cloud server in order of priority determined based on a type of the communications link/channel in the network connecting the cloud server and the client device. The client device may determine information about the type of the communications link/channel in the network, and then based on the type of the network, the client device may then determine the order of priority for all sets of data updates and subsequently transmit the first subset of data updates and/or the second subset of data updates to the cloud server in the determined order of priority.

In some embodiments, a client device may transmit the first subset of data updates and the second subset of data updates to the cloud server in order of priority determined based on a speed and a quality of transmission available for the communications link/channel in the network connecting the client device and the cloud server. The client device may determine information about the speed and the quality of the communications link/channel in the network from the database, and then based on the speed and the quality of the network, the client device may then determine the order of priority for all sets of data updates and subsequently transmit the first subset of data updates and/or the second subset of data updates to the cloud server in the determined order of priority.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
generating, by a cloud server of a cloud-computing infrastructure, a plurality of cloudlets comprising one or more application programs, each cloudlet configured to operate independently as a remote cloud server;
transmitting, by the cloud server, the plurality of cloudlets to a corresponding plurality of client devices;
receiving, by the cloud server from a client device having a cloudlet comprising an application program, execution instructions for one or more cloud tasks and a data update for a one or more cloud databases in response to a bandwidth value of a communications link between the cloud server and the client device satisfying a connection threshold value; and
executing, by the cloud server, one or more cloud tasks using the data update according to the instructions and the data update received from the application program of the cloudlet.

2. The method according to claim 1, wherein each cloudlet includes a copy of a cloud database associated with the application program.

3. The method according to claim 1, wherein executing the one or more cloud tasks includes transmitting, by the cloud server, the data update to a second client device having a second cloudlet comprising the application program.

4. The method according to claim 3, wherein transmitting the data update to the second client device includes determining, by the cloud server, that a bandwidth value of a communications link between the cloud server the second client device satisfies a connection threshold value.

5. The method according to claim 3, further comprising compressing, by the cloud server, the data update according to one or more data compression functions prior to transmitting the data update to the second client device.

6. The method according to claim 1, wherein executing the one or more cloud tasks includes updating, by the cloud server, a cloud database according to the data update received from the client device.

7. The method according to claim 6, further comprising transmitting, by the computer, at least a portion of the data update to one or more pre-positioned databases associated with the cloud database.

8. The method according to claim 1, further comprising assigning, by the cloud server, a priority level to the data update received from the client device based upon a set of priority criteria, wherein the cloud server executes the one or more cloud tasks using the data update in accordance with the priority level.

9. The method according to claim 8, further comprising receiving, by the cloud server from one or more client devices of the plurality of client devices, a plurality of data updates to a same cloud database record associated with the data update received from the client device, at least one data update conflicts with the data update received from the client device,
wherein the cloud server assigns the priority level corresponding to each data update received from each client device.

10. A system comprising:
a cloud server of a cloud-computing infrastructure coupled to a plurality of client devices, the cloud server comprising a processor and configured to:
generate a plurality of cloudlets comprising one or more application programs, each cloudlet configured to operate independently as a remote cloud server;
transmit the plurality of cloudlets to the plurality of client devices respectively;
receive, from a client device having a cloudlet comprising an application program, execution instructions for one or more cloud tasks and a data update for a one or more cloud databases in response to a bandwidth value of a communications link between the cloud server and the client device satisfying a connection threshold value; and
execute one or more cloud tasks using the data update according to the instructions and the data update received from the application program of the cloudlet.

11. The system according to claim 10, wherein each cloudlet includes a copy of a cloud database associated with the application program.

12. The system according to claim 10, wherein, when executing the one or more cloud tasks, the cloud server is further configured to transmit the data update to a second client device having a second cloudlet comprising the application program.

13. The system according to claim 12, wherein, when transmitting the data update to the second client device, the cloud server is further configured to determine that a bandwidth value of a communications link between the cloud server the second client device satisfies a connection threshold value.

14. The system according to claim 12, wherein the cloud server is further configured to compress the data update according to one or more data compression functions prior to transmitting the data update to the second client device.

15. The system according to claim 10, wherein, when executing the one or more cloud tasks, the cloud server is further configured to update a cloud database according to the data update received from the client device.

16. The system according to claim 15, wherein the cloud server is further configured to transmit at least a portion of the data update to one or more pre-positioned databases associated with the cloud database.

17. The system according to claim 10, wherein the cloud server is further configured to assign a priority level to the data update received from the client device based upon a set of priority criteria, and
wherein the cloud server executes the one or more cloud tasks using the data update in accordance with the priority level.

18. The system according to claim 17, wherein the cloud server is further configured to receive, from one or more client devices of the plurality of client devices, a plurality of data updates to a same cloud database record associated with the data update received from the client device, at least one data update conflicts with the data update received from the client device, and
wherein the cloud server assigns the priority level corresponding to each data update received from each client device.

* * * * *